H. GOLDSON.
Shovel-Plow.
No. 8,524
Patented Nov. 18, 1851.
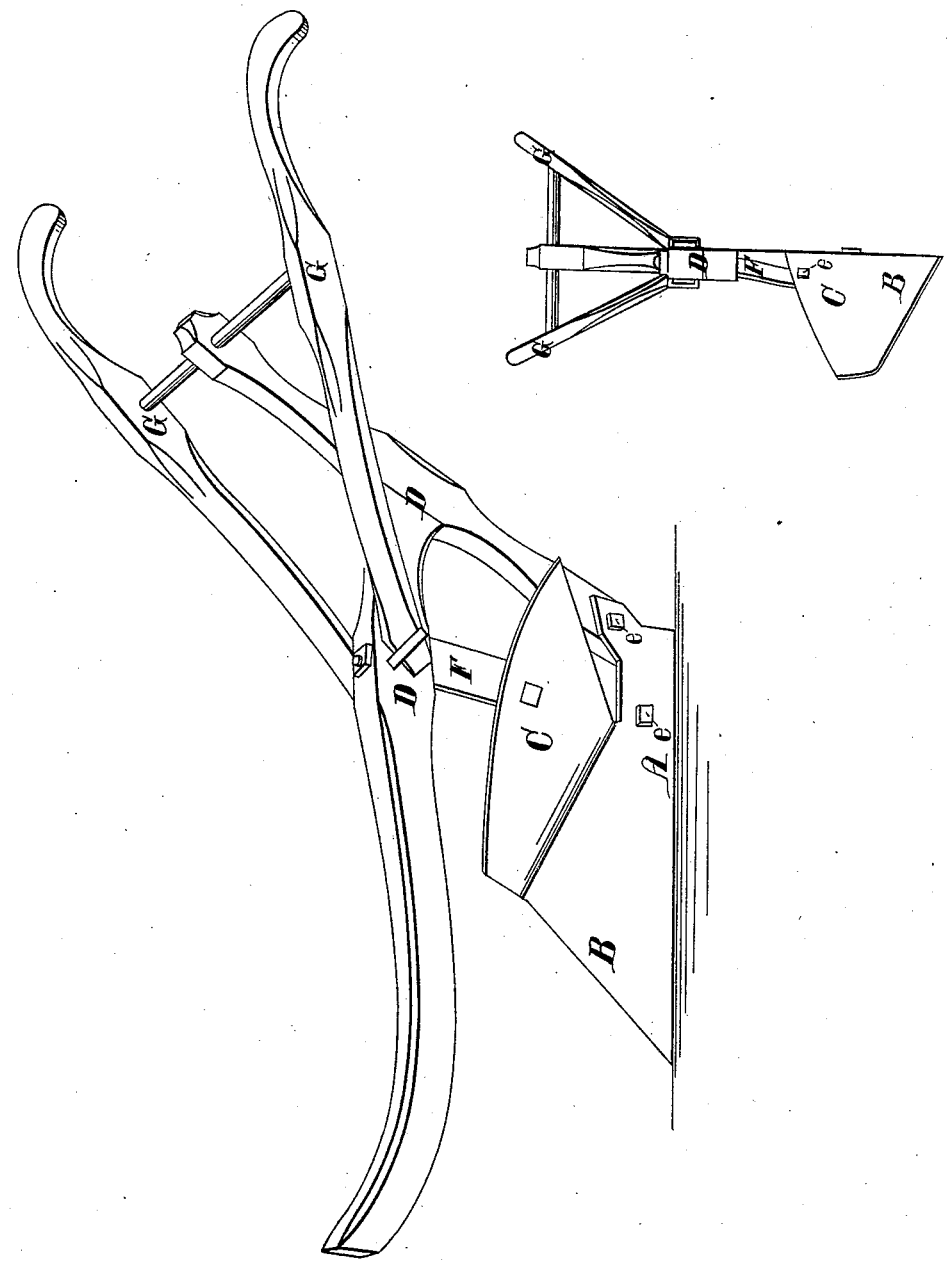

UNITED STATES PATENT OFFICE.

HENRY GOLDSON, OF GREENSBOROUGH, MISSISSIPPI.

IMPROVEMENT IN PLOWS.

Specification forming part of Letters Patent No. 8,524, dated November 18, 1851.

*To all whom it may concern:*

Be it known that I, HENRY GOLDSON, of Greensborough, in the county of Sumner and State of Mississippi, have invented a new and useful Agricultural Implement for Cultivating Cotton-Plants, of which the following is a full, clear, and exact description, reference being had to the accompanying drawings, which form part of this description, and in which—

Figure 1 represents a view in perspective of my cotton-scraper, and Fig. 2 is a front elevation of the same.

My invention consists of an implement by means of which the surface of the earth lying near to the cotton-plants and the weeds growing therein can be pared off in a thin slice without injury to the roots of the plants, and thrown toward the center of the open space between the rows.

The implement, as represented in the accompanying drawings, has the general form of a plow, with the difference that the share and mold-board are placed on the side of the implement opposite to that to which the furrow is turned, so that they throw the slice of earth across the land side of the instrument instead of to the furrow side, as is the customary arrangement in plows.

I prefer to construct the landside A, the share B, and the mold-board C all of a single piece, either of sheet or cast metal, as may be found most expedient; or these parts may be made separately and united in any convenient manner. The portions thus constructed are connected with a suitable stock, D, by means of bolts e and a standard, F. The hinder part of the stock is fitted with handles G, for the purpose of directing the machine when drawn along by horse or other power applied to the front end of the beam.

When this machine is employed in cultivating cotton-plants it is drawn along between the rows, with the wing of the mold-board C as close as possible to the plants. As it is moved along the share B pares or scrapes off a thin slice of the earth lying above the roots, and the mold-board C throws the slice across the landside of the instrument into the space between the rows.

The implement thus constructed may be employed in connection with the plow, the latter to be used for throwing the earth toward the plants and the former for throwing it away from the plants, thus keeping the surface of the earth thoroughly pulverized and free from weeds without either uncovering the roots or accumulating too great a quantity of earth upon them.

This implement almost entirely dispenses with the ordinary hand-hoeing, as when the earth on both sides of the plants has been dressed off by it but a narrow strip of earth is left between the plants in the line of the rows which requires the employment of the hand-hoe; whereas when the common plow alone is used a broad strip of from eight to twelve inches in width is left to be subsequently tilled by the hand-hoe.

What I claim as my invention, and desire to secure by Letters Patent, is—

A cotton-scraper, constructed as herein described, with a share and mold-board projecting from the side of the landside opposite that to which the earth is thrown, the landside thus extending from the point of the scraper to that wing of the mold-board opposite the one to which it usually extends, and the several parts being so arranged that the landside will run deep enough to hold the implement firmly to its work, the share will pare the ground and cut off the weeds near the roots of the plants, and the mold-board will conduct the same toward the middle of the space between the rows.

In testimony whereof I have hereunto subscribed my name.

HENRY GOLDSON.

Witnesses:
E. S. RENWICK,
P. H. WATSON.